United States Patent [19]

Juy

[11] 4,275,922
[45] Jun. 30, 1981

[54] SADDLE SHANK FOR BICYCLES AND SIMILAR VEHICLES

[75] Inventor: Henri Juy, Dijon, France

[73] Assignee: Le Simplex, Dijon, France

[21] Appl. No.: 967,304

[22] Filed: Dec. 7, 1978

[30] Foreign Application Priority Data

Dec. 19, 1977 [FR] France ............................... 77 38929

[51] Int. Cl.³ ........................... B62J 1/00; F16B 7/08
[52] U.S. Cl. ...................................... 297/195; 403/82
[58] Field of Search ............ 297/195; 280/282, 281 R; 403/82, 87

[56] References Cited

U.S. PATENT DOCUMENTS

| 540,118 | 5/1895 | Stearns | 403/82 |
| 3,891,333 | 6/1975 | Corderac'k | 297/195 X |
| 3,933,391 | 1/1976 | Shook | 297/195 |
| 3,992,054 | 11/1976 | Campagnolo | 297/195 |
| 4,142,813 | 3/1979 | Laborde | 403/87 X |
| 4,155,590 | 5/1979 | Cunningham | 297/195 |

FOREIGN PATENT DOCUMENTS

| 610862 | 10/1960 | Italy | 297/195 |
| 350888 | 1/1961 | Switzerland | 297/195 |
| 407436 | 3/1934 | United Kingdom | 297/195 |

Primary Examiner—Roy D. Frazier
Assistant Examiner—Peter A. Aschenbrenner
Attorney, Agent, or Firm—Haseltine and Lake

[57] ABSTRACT

A saddle shank for bicycles and similar vehicles having a tube and a mounting and abutment head fastened with the tube. A carriage is provided for securing metallic body wires of a saddle and supporting the saddle while permitting adjustment of the position of the saddle in the general axis of a bicycle with respect to the saddle shank. The saddle shank has a saddle supporting carriage, having one end mounted for pivotal abutment on the head, and another end of the carriage abutting against an adjustable stop which supports the head. The carriage is provided with indents for stable bearing of the metallic body wires and a yoke, said yoke being provided with mating indents for co-action with indents of the carriage, being mounted above the carriage. An assembly and interlocking means, such as a screw, extends with necessary clearance through the head and the carriage, between the pivotal abutment and the adjustable stop for threadable engagement within the yoke, the screw head being retained in abutment against the head.

12 Claims, 15 Drawing Figures

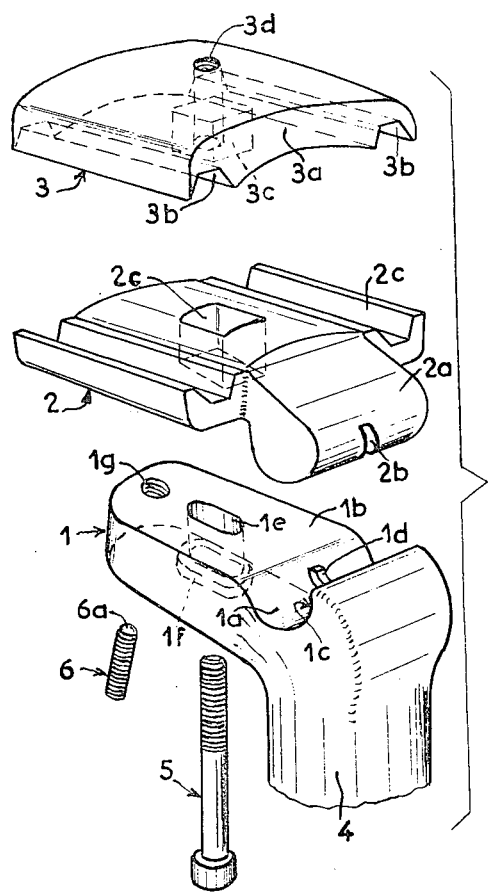
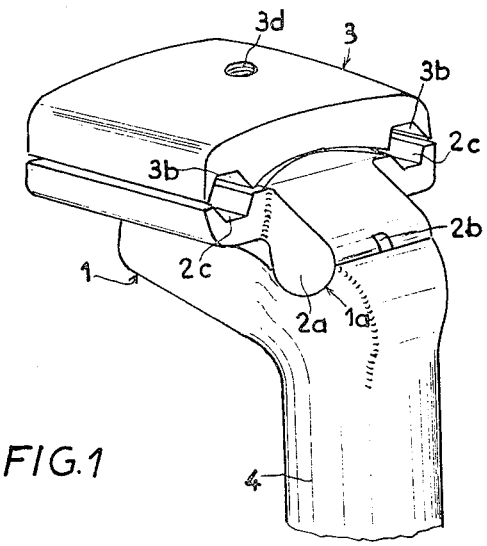
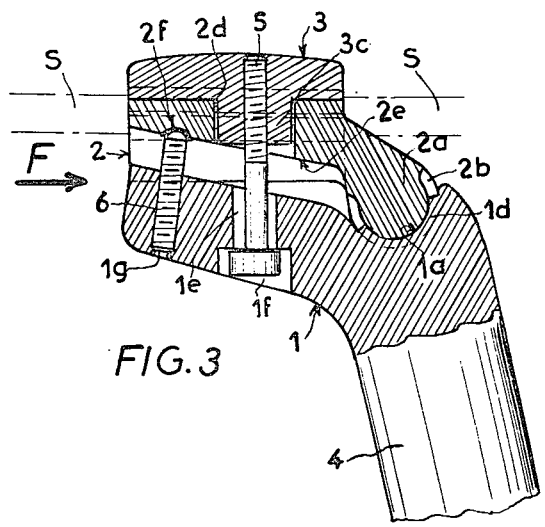
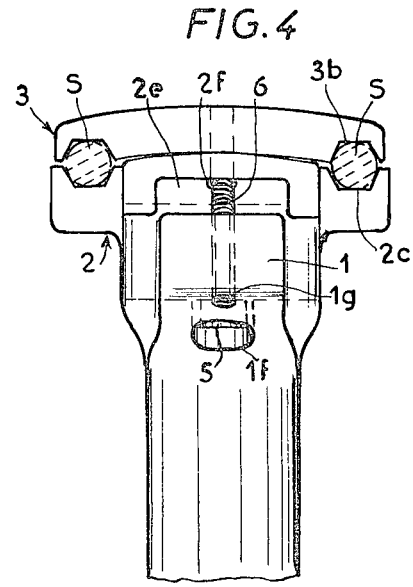

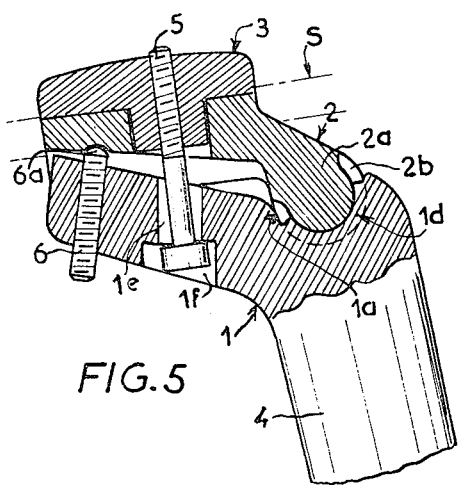

SADDLE SHANK FOR BICYCLES AND SIMILAR VEHICLES

BACKGROUND OF THE INVENTION

The invention relates to a saddle shank for bicycles and similar vehicles.

More particularly the invention belongs to the technical field of the utilities for cycles and similar vehicles.

SUMMARY OF THE INVENTION

According to the invention, it has been found desirable to provide a saddle shank which can be produced economically with a low cost price, while ensuring the safety in use, the strength of the various parts and the reliability, as the saddle shank is an important element of the bicycle, this shank being the intermediate means between the saddle which receives the weight of the cyclist and the frame of the bicycle. A further object was also to provide simple and safe means for rendering absolutely easy and ready the assembly of the saddle and the adjustments thereof.

The saddle shank in accordance with the invention is comprised of a tube engaged and secured within the corresponding tube of the frame, of a supporting and mounting head fast with this tube directly or detachably, and of a carriage for fixing the mount of the saddle and supporting the saddle while permitting the adjustment of the endwise and angular positions of said saddle, said saddle shank being characterized in that an end of the saddle bearing carriage is mounted for pivotal abutment on the head, the other end of the carriage abutting against an adjustable stop supported by the head (or the carriage), said carriage being provided with indents or equivalent recesses for supporting securely the wires of the mount of the saddle, a yoke with indents or equivalent recesses in front of the indents of the carriage being mounted above the carriage, an assembling and interlocking means such as a screw extending with the necessary clearance through the head of the carriage between the pivotal abutment and the adjustable stop to be engaged threadedly within the yoke, the head of the screw being held in abutment against the head.

These and other characteristics will be readily apparent from the following description, read in connection with the attached drawings illustrating the object of the invention, without however restricting it to said description and drawings.

IN THE DRAWINGS

FIG. 1 is a perspective view showing the various separate parts of the saddle shank according to a first form of embodiment;

FIG. 2 is a perspective view of the saddle shank in assembled position;

FIG. 3 is a longitudinal sectional view of the saddle shank in accordance with this first form of embodiment, shown in intermediate position of angular adjustment;

FIG. 4 is a view along the arrow F of FIG. 3, of the saddle shank in accordance with the first form of embodiment;

FIGS. 5 and 6 are sectional views similar to FIG. 3, showing the saddle shank in two opposed positions of angular adjustment;

FIG. 7 is a sectional view similar to FIG. 3, illustrating a saddle shank with a spring interposed between the carriage and the yoke;

FIG. 8 is a plan view of the carriage according to the form of embodiment of FIG. 7;

FIGS. 9 and 10 are respectively perspective and front views, illustrating a head and a carriage in accordance with an alternative embodiment of the pivotal abutment;

Figure 11:
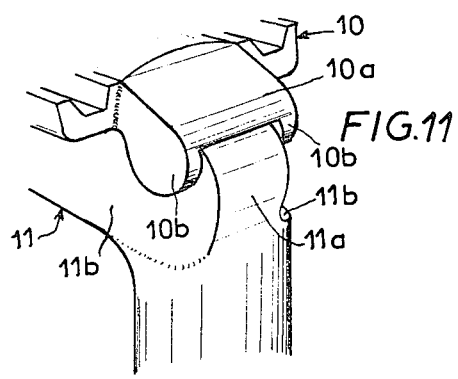
FIGS. 11 and 12 are perspective views showing two alternative forms of embodiment of the transversal positioning of the carriage on the head.

To make the invention better understood, the object of this invention will be described now in non-restrictive forms of embodiment as illustrated in the Figures of the drawings.

DESCRIPTION OF THE INVENTION

There will be seen FIGS. 1–6 a first form of embodiment of the saddle shank, which includes essentially a head 1, a carriage 2 and a yoke 3.

The head 1 can be formed directly together with the saddle tube 4, or can be mounted detachably, and extends rearwardly of the tube along an angle which is preferably obtuse relatively to said tube.

The head has adjacent to the axis of the tube a cradle 1a in stepped position which is connected to the rearwardly offset portion 1b by a rounded portion while the cradle extends higher at the opposite side to form an abutting face 1c. A sector like projection 1d is formed directly or detachably in this cradle, preferably centrally.

Moreover, the head has in the middle portion of the offset face an oblong opening 1e with a housing 1f at the bottom, and a tapped hole 1g at the end.

The carriage 2 is formed by a plate which is approximately rectangular and connected on one side with a projection slanting downwardly 2a, the shape of which corresponds approximately to the shape of the cradle. A slot 2b is provided in this projection for cooperation with the sector 1d of the head at the time of the assembly. At right angle to the projection 2a, the carriage is provided with well known, laterally protruding endwise indents 2c for receiving the mount wires of the saddle S (dotted lines, FIG. 3), while in the convex central part of the carriage there is a polygonal aperture 2d opening above and below the carriage, the lower face of which has a slope or inclined stepped portion 2e of a width that is equal to or greater than the width of the head (FIG. 4).

The yoke 3 has a central portion 3a which is formed concave to mate with the convex portion of the carriage, and has on either side endewise indents 3b that are complementary to the indents 2c of the carriage for interlocking the wires of the mount of the saddle. Moreover, the central portion 3a is provided from the lower face thereof with a projection like bearing 3c of squared cross section, corresponding for instance with the cross section of the aperture 2d of the carriage in which this bearing is freely slidable without being rotatable, a tapped hole 3d being provided in this bearing and in the central portion.

Moreover, it will be seen FIG. 1 a hollow hexagonal head screw 5 and a hollow hexagonal grub screw 6, the purpose of which will be apparent later, concerning the assembly and the adjustments, that will be described now.

The carriage 2 is placed in pivotal abutment on the head by means of the projection 2a thereof engaged within the cradle 1a of the head, in which the carriage is positioned transversely by the cooperation of the slot 2b of the projection of the carriage with the sector 1d of the head. It will be appreciated that in this manner, the carriage may be pivoted freely from a certain angle limited in the downward position by the abutment of the inclined stepped portion 2e of the carriage on the offset portion 1b of the head, and in the upward position by an end of the slot 2b coming to rest on a face of the sector 1d.

The yoke 3 is coupled to the carriage by the bearing 3c thereof which is slidingly engageable within the aperture 2d of the carriage. The screw 5 is then engaged across the oblong opening 1e of the head to be screwed within the tapped hole 3d of the yoke. The carriage 2 comes then to rest on the end of the screw 6 tightened within the tapped hole 1g of the head and protruding above said head.

When so assembled, the saddle shank can be positioned in the tube of the frame (not shown) in a known manner, and the saddle can be secured to the shank by engaging the mount wires S between the indents 2c of the carriage and 3b of the yoke which are spaced apart from one another by loosening the screw 5. It will be noted that the length of the guide bearing 3c of the yoke is preferably such that said bearing does not break loose from the opening 2d of the carriage when it is desired to engage the mount wires between the indents, which makes it possible to keep the indents 3b of the yoke in alignment with indents 2c of the carriage.

When the saddle is mounted on the shank, it is necessary then to adjust its endwise and its angular position relatively to the morphology of the cyclist. To do this, it is sufficient to actuate the grub screw 6 in either direction and to tighten securely the yoke-carriage assembly relatively to the head in the desired position by actuating the screw 5 which can be set on various inclinations owing to the oblong opening 1e of the head, and as the case may be (to make sure of a correct tightening) owing to its abutment in a convex housing 1f (FIGS. 3, 4 and 5 more particularly).

The adjustment is thus made in succession of the angular position (by the screw 6) and of the endwise position of the saddle (by the screw 5 which also serves for tightening securely in position the carriage-yoke assembly on the head).

It is well understood that many alternative forms of embodiment are possible within the scope of the invention.

It will be seen for instance in FIGS. 1, 3, 4, 5, 6 and 7, that the angular adjustment screw 6 has a contact end 6a in the form of a spherical dome, and that this screw abuts within a corresponding indent or socket 2f of the carriage, in order to ensure a more secure abutment regardless of the inclination of the carriage.

In FIG. 7, it may be seen that the protruding bearing 3c of the yoke is provided from its lower face with a housing 3e, and that the polygonal opening 2d of the carriage has a bottom 2g. Between this bottom and the bottom of the housing 3e there is disposed a coil spring 7 concentrically to the screw 5 which extends through the carriage through an oblong opening 2h (FIG. 8) formed between the bottom 2g and the slanting face 2e, and is engaged threadedly within the tapped hole 3d of the yoke following the housing 3e.

The spring 7 makes it possible to bring down the carriage on the screw 6 when the yoke-carriage assembly is loosened by means of the screw 5, and to move away automatically the yoke 3 from the carriage 2 by the same action on the screw 5 when it is desired to engage the mount wires S within the indents.

In FIGS. 9 and 10, there is illustrated a reverse form of embodiment of the pivotal abutment of the carriage on the head. Effectively, there may be seen here that the carriage 8 has a cradle-like connecting part 8a for capping a mating projection 9a of the head 9, the transverse positioning of the carriage on the head being provided by a sector like projection 8b of the carriage which penetrates when assembling within a slot 9b of the head (FIG. 10).

It is well understood that in this form of embodiment, the projection and the cradle can also be provided indifferently on the carriage or on the head.

Figure 12:
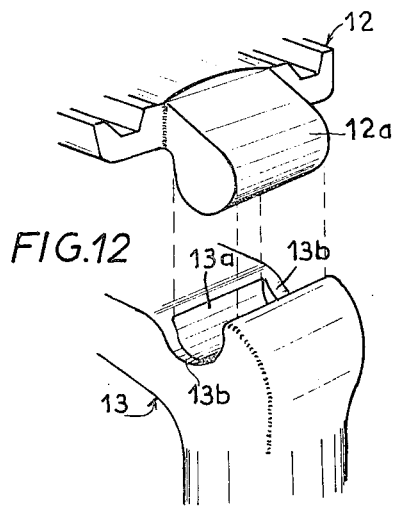

FIGS. 11 and 12 show two further embodiments of the transverse positioning of the support member relative to the mounting head. Referring to FIG. 11, the support member 10 has a connecting portion 10a with lateral flanges 10b which, when mounted, are positioned either side of the portion 11a of the mounting head 11 faces 11b.

Referring to FIG. 12, the connecting portion 12a of the support member 12 may be narrower than the head 13 and may fit into the connecting portion 13a of the head 13 which has lateral flanges 13b to limit the transverse movement (FIG. 12).

Figure 13:
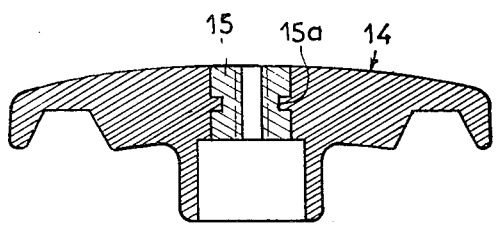
FIG. 13 is a sectional view of the yoke according to a form of embodiment, in which the yoke has a metal insert for tightening the screw for assembling the three elements and interlocking the yoke on the carriage, and the yoke-carriage assembly on the head.

In FIG. 13, there has been illustrated a clamping yoke 14 the connecting portion of which with the screw 5 is formed by a sunk screw or a steel insert 15 making it possible to provide a better hold of the assembly with the screw, due to the fact that the yoke (as well as the carriage and/or the head) consists generally of light alloy. This alternative can be used both for the embodiment with spring and for the embodiment without spring.

It has been illustrated here an insert 15 of polygonal outside cross section (hexagonal for instance) in order to secure this insert against rotation relatively to the carriage, and having a middle groove 15a to secure it against pulling out. It is also possible to provide a nut with polygonal head and knurled, channeled, grooved cylindrical shank, or with polygonal shank.

Figure 14:
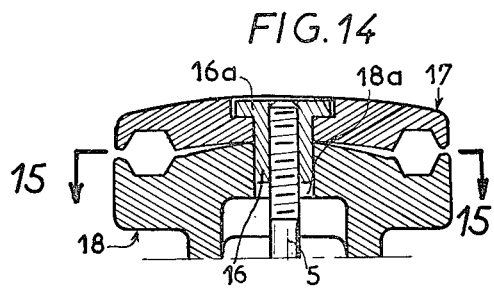
FIG. 14 is a sectional view in part of the saddle shank according to a further alternative of embodiment for guiding the yoke on the carriage.
Figure 15:
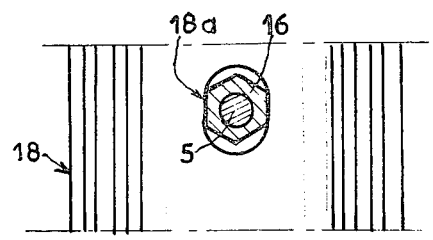
FIG. 15 is a plan sectional view along the line 15—15 of FIG. 14.

For the same purpose, it is also possible, as illustrated in FIGS. 14 and 15, to provide a nut 16 of polygonal outside cross section (hexagonal for instance) with a head 16a which is also polygonal and is extended beneath the yoke 17 to form directly the guide bearing within the opening 18a of the carriage 18 which can be of the same section or more advantageously oblong (FIG. 16). This embodiment is to be used when no spring is provided between the yoke and the carriage. It it is desired to add a spring, it is necessary then to provide the nut 16 with a housing, and the opening of the carriage with a bottom followed by an oblong screw passage.

The advantages will be readily apparent from the description, and more particularly:

The economical and reliable embodiment of the saddle shank, consisting of elements of simple shapes, without elaborate assemblies.

The ready assembly and adjustments by means of screws which are within easy reach from below.

The strength and good stiffness of the unit, thanks to the compactness thereof and to the connections securely assembled while remaining easily detachable.

The invention is not in any way restricted to the forms of use and to the embodiments of its various parts that have been more particularly set forth herein; on the contrary, the invention is intended to include all the alternative forms of use and embodiments that fall within its scope.

What is claimed:

1. A saddle shank for bicycles and similar vehicles, comprising: a tube; a mounting and abutment head fastened with the tube; a carriage for securing metallic body wires of a saddle and supporting the saddle while permitting adjustment of the position of the saddle in the general axis of a bicycle with respect to the saddle shank, said saddle shank comprising: a saddle supporting carriage, said carriage having one end mounted for pivotal abutment on the head, an other end of the carriage abutting against an adjustable screw means which is insertable into said head to support the carriage on the head, said carriage being provided with indents for stable bearing of the metallic body wires; a yoke; said yoke being provided with mating indents for co-action with indents of the carriage, being mounted above the carriage; and an assembly and interlocking means, such as a screw, extending with necessary clearance through the head and the carriage, between the pivotal abutment and the adjustable stop for threadable engagement within the yoke, the screw head being retained in abutment against the head.

2. A saddle shank as set forth in claim 1, wherein: the pivotal abutment of the carriage on the head is in the form of a transverse bearing of partly circular section with which the carriage is provided at one end and which is abutting in a complementary shaped cradle of the head, means being provided for setting the transverse position of the carriage relatively to the cradle and to the head, while permitting free swivelling and immediate separation of the head and the carriage when the assembly and interlocking screw is loosened.

3. A saddle shank as set forth in claim 1, wherein: the pivotal abutment of the carriage on the head is in the form of a transverse bearing of partly circular section with which the head is provided at one end and which is abutting in a complementary shaped cradle of the carriage, means being provided for setting the transverse position of the carriage relative to the cradle and to the head, while permitting free swivelling and immediate separation of the head and the carriage when the assembly and interlocking screw is loosened.

4. A saddle shank as set forth in claim 1 and according to either claim 2 or 3, wherein: the transverse positioning of the carriage relative to the head is provided by the engagement of a slot of the carriage abutment bearing on a protruding sector of the cradle of the head.

5. A saddle shank a set forth in claim 1 and according to either claim 2 or 3, wherein: the transverse positioning of the carriage relatively to the head is provided by lateral cheeks with which the head is provided at the level of the pivotal abutment thereof.

6. A saddle shank as set forth in claim 1, wherein: the clamping yoke for the wires of the saddle mount on the carriage, is provided at the lower part with a polygonal bearing which is capable of sliding within a corresponding housing of the carriage, to hold the corresponding indents of the yoke and of the carriage in alignment.

7. A saddle shank as set forth in either claims 1 or 6, wherein: a coil spring like elastic means is interposed between the yoke and the carriage concentrically to the assembly and interlocking screw, preferably between a housing of the sliding bearing of the yoke and the bottom of the carriage housing, whereby the carriage is urged down on the head on the one hand, and to urge the yoke back on the other hand, when the assembly and interlocking screw is loosened.

8. A saddle shank as set forth in claim 1, wherein: said carriage and said head are provided with passageway orifices for the assembly and interlocking screw, the cross section of said orifices being oblong in the endwise direction to enable angular adjustment of the carriage relatively to the head.

9. A saddle shank as set forth in claim 1, wherein: the clamping yoke for the wires of the saddle mount is provided with a sunk female member for receiving a threaded screw to tighten the assembly and interlocking screw.

10. Saddle shank as set forth in claim 1, wherein: the carriage is provided on the lower face thereof, with a central recess that is slanted relative to said face, to rest on the head while providing a greater lateral clearance.

11. Saddle shank as set forth in claim 1, wherein: angular adjustment of the carriage relative to the head is provided by a screw to be engaged threadedly and obliquely at the end of the head opposite to the pivotal abutment, the convex end of which is abutting within a corresponding indent underneath the carriage.

12. A saddle shank as set forth in claim 1, wherein: the yoke is provided with an inserted nut, the lower portion of which forms a sliding bearing in the opening of the carriage by at least two flat faces of the periphery thereof, and a tapped hole receiving the assembly and interlocking screw.

* * * * *